US009372889B1

(12) United States Patent
Jakobsson et al.

(10) Patent No.: US 9,372,889 B1
(45) Date of Patent: Jun. 21, 2016

(54) INCREMENTAL STATISTICS UPDATE

(71) Applicant: Amazon Technologies, Inc., Reno, NV (US)

(72) Inventors: Hakan Jakobsson, San Francisco, CA (US); Zelaine Fong, San Carlos, CA (US)

(73) Assignee: Amazon Technologies, Inc., Reno, NV (US)

( * ) Notice: Subject to any disclaimer, the term of this patent is extended or adjusted under 35 U.S.C. 154(b) by 177 days.

(21) Appl. No.: 13/856,724

(22) Filed: Apr. 4, 2013

(51) Int. Cl.
*G06F 17/00* (2006.01)
*G06F 17/30* (2006.01)

(52) U.S. Cl.
CPC ............................... *G06F 17/30448* (2013.01)

(58) Field of Classification Search
None
See application file for complete search history.

(56) References Cited

U.S. PATENT DOCUMENTS

| | | | |
|---|---|---|---|
| 6,360,214 B1* | 3/2002 | Ellis et al. | |
| 7,248,120 B2* | 7/2007 | Burgener et al. | 330/311 |
| 7,577,679 B2* | 8/2009 | Sinclair | |
| 7,603,339 B2* | 10/2009 | Cruanes | G06F 17/30442 |
| 7,890,491 B1* | 2/2011 | Simmen | 707/713 |
| 9,251,155 B1* | 2/2016 | Galimberti | G06F 17/30292 |
| 2004/0034643 A1* | 2/2004 | Bonner et al. | 707/100 |
| 2006/0036576 A1* | 2/2006 | Simmen | 707/2 |
| 2008/0120272 A1* | 5/2008 | Sinclair | 707/2 |
| 2008/0120274 A1* | 5/2008 | Cruanes et al. | 707/2 |
| 2008/0120275 A1* | 5/2008 | Cruanes | G06F 17/30442 |
| 2008/0120675 A1* | 5/2008 | Morad et al. | 725/120 |
| 2008/0133454 A1* | 6/2008 | Markl et al. | 707/2 |
| 2008/0162416 A1* | 7/2008 | Sinclair | G06F 17/30315 |
| 2008/0195577 A1* | 8/2008 | Fan et al. | 707/2 |
| 2008/0256025 A1* | 10/2008 | Bestgen et al. | 707/2 |
| 2009/0018992 A1* | 1/2009 | Zuzarte et al. | 707/2 |
| 2009/0077054 A1* | 3/2009 | Muras et al. | 707/5 |
| 2009/0216709 A1* | 8/2009 | Cheng et al. | 707/2 |
| 2010/0030728 A1* | 2/2010 | Chakkappen et al. | 707/2 |
| 2011/0191299 A1* | 8/2011 | Huynh Huu | G06F 17/30 707/646 |
| 2014/0074853 A1* | 3/2014 | Nath | G06F 17/30457 707/743 |
| 2015/0317359 A1* | 11/2015 | Tran | G06F 17/30345 707/718 |

OTHER PUBLICATIONS

"Best Practices for Gathering Optimizer Statistics", An Oracle White Paper, Apr. 2012.*
"Understanding Optimizer Statistics", An Oracle White Paper, Jan. 2012.*

* cited by examiner

*Primary Examiner* — Hung Le
(74) *Attorney, Agent, or Firm* — Baker & Hostetler LLP

(57) ABSTRACT

A data warehousing system maintains large tables comprising a significant quantity of historical data. In general, the addition of small quantities of additional data is not likely to significantly alter the accuracy of statistics relied upon by a query optimizer. However, certain statistics may have an influence on optimizer behavior, even though the size of the additional data is small. Certain statistics relied on by the optimizer may be incrementally updated based at least in part on characteristics of the additional data without requiring a scan of the preexisting data.

24 Claims, 7 Drawing Sheets

US 9,372,889 B1

INCREMENTAL STATISTICS UPDATE

BACKGROUND

Various types of database management systems may contain large quantities of data, to which a relatively small amount is added frequently. One example is seen in data warehouse applications employed for online analytical processing, data mining and similar uses, which may be employed to retain voluminous quantities of transactional data in a single table. At the same time, query performance may be an important factor to such systems.

Queries over large tables may take considerable time, and accordingly the efficiency of the queries is an important consideration. A database component known as a query optimizer may be responsible for producing optimized plans of query execution. To perform its role, the query optimizer may rely on various statistical measures describing aspects of the data stored in the database. For example, the query optimizer may rely on statistics indicative of data distribution, data volume and so forth to determine an optimized plan for performing the query. Inaccurate query optimization statistics may cause the query optimizer to produce plans that are deficient in some way.

At the same time, recalculating statistics for the entire table may be prohibitively expensive in terms of time and computing resources. There may also be various risks associated with a full recalculation, such as the potential, however small, that query behavior will be unexpectedly and detrimentally affected. At the same time, if the amount of data added to the system is relatively small, the query optimization statistics might not change in a manner that would alter the performance of the query optimizer. It may therefore be advantageous to avoid full recalculations of the optimization statistics.

BRIEF DESCRIPTION OF DRAWINGS

The drawings provided herein are designed to illustrate example embodiments and are not intended to limit the scope of the disclosure. Although some of the drawings are depicted as a sequence of operations, those of ordinary skill in the art will appreciate that many of the depicted steps may be recombined, reordered, performed in parallel, omitted or modified.

DETAILED DESCRIPTION

Figure 1:
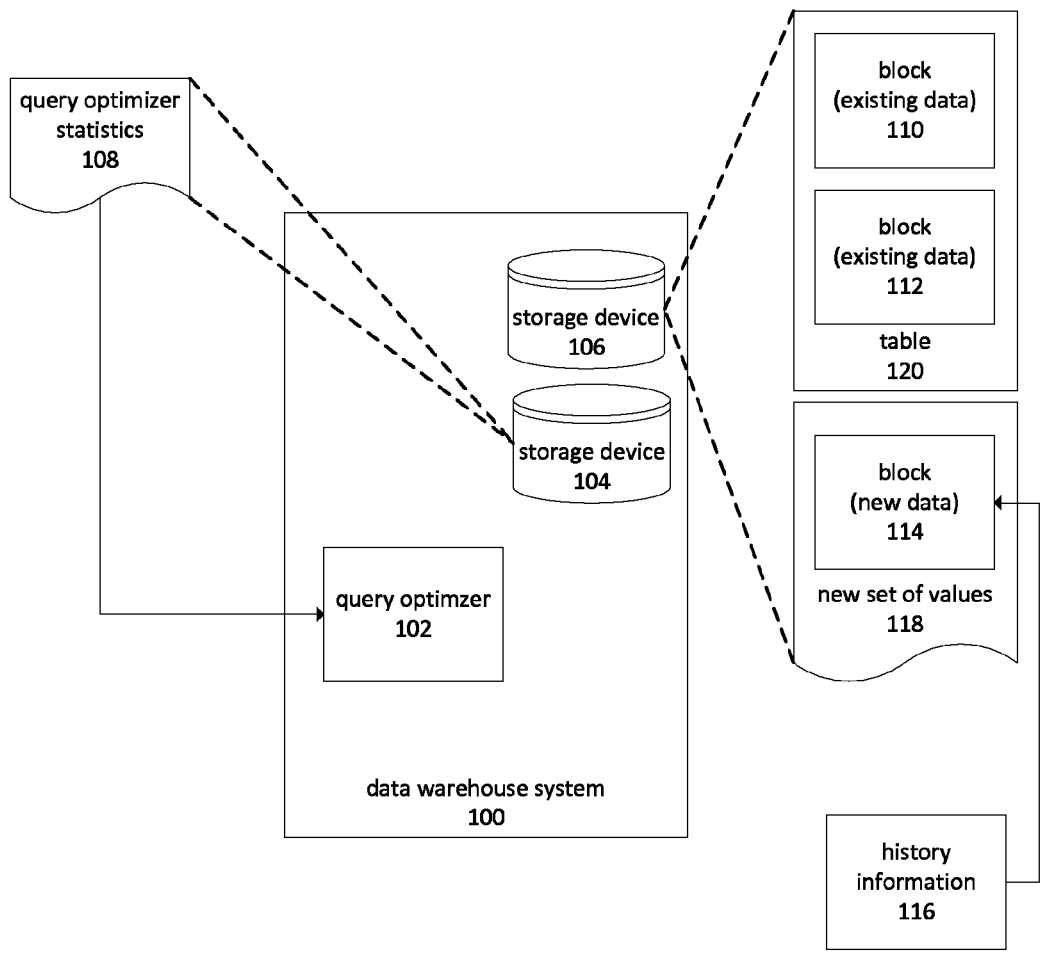
FIG. 1 is a diagram depicting an embodiment of a database management system whose optimizer statistics are incrementally updated using techniques consistent with aspects of the present disclosure.

Database management systems may contain large quantities of historical data. One pattern of use may involve a table containing a large number of rows primarily consisting of historical data. On a periodic basis additional data may be imported into the system and merged into the table. For example, a data warehouse system might store several years' worth of sales data in a single table. On a nightly basis, that day's sales might be merged into the table.

Merging data into an existing table may involve storing the data in one of various types of block structures that might be employed by the database system. Relational database management systems may employ blocks containing a subset of the rows and columns that comprise the table. Columnar database may store blocks containing only columns. The latter approach may be preferred by data warehousing applications, because online analytical processing, data mining and so forth perform aggregations over columnar data with greater frequency than relational databases. In both cases, the blocks in which the data is stored may, for example, be allocated on a storage device prior to the insert or allocated dynamically as the data is inserted.

Over the course of time, a table subject to frequent loading of additional data may become quite large. Queries that involve the table may become prohibitively expensive if performed in an inefficient manner. In order to efficiently process queries, database management systems may rely on a component sometimes described as a query optimizer. The query optimizer generates a plan of execution for a query that is optimized based on various factors such as table size, the presence or absence of indexes, the effect of restrictive clauses and filters on the query and so forth. In the data warehouse scenario just described, the plan generated by the query optimizer may significantly influence the execution time of the query due to the size of the table. An inefficient query plan may cause the execution time of the query to be unreasonably long.

Query optimizers may also rely on a set of table statistics to generate query execution plans. The set of table statistics may describe features concerning the amount and distribution of the data contained within the table. Various examples of table statistics include the number of rows, the number of unique values within a column, the minimum and maximum values within a column, value distribution histograms, the number of blocks, density of utilization within blocks and so forth. The query optimizer may examine various features of the query in light of these statistics to generate a query plan. For example, the query optimizer may evaluate a histogram indicative of the distribution of values within a column in light of the conditions specified in a subquery's filter clause in order to estimate the number of rows that might be returned by executing the subquery. Similarly, a query optimizer might examine min/max values to determine if a filtered subquery is likely to return any rows at all, because the filter might specify range conditions corresponding to the min/max values.

The query optimizer relies on the quality of the statistics to generate good execution plans. If the statistics relied upon are inaccurate, the result may be an inefficient plan. Because of the large table sizes sometimes seen in data warehouse applications, inefficient query execution plans may cause execution of a query to become impractical. Accordingly, reasonably accurate statistics are an important factor in data warehouse applications, where reasonably accurate implies statistical values that properly influence query plan generation.

However, large tables such as those seen in data warehouse applications may store a significant amount of data. Full recalculation of the statistics may take some time, even if ameliorating techniques such as statistical sampling are employed. In general, if the cost of calculating the statistics is no better than proportional to the size of the historical data, the cost of calculating query optimization statistics may become prohibitively expensive. Ideally, an incremental update could be employed that would have a cost approximately proportional to the size of the data being inserted into the table.

Various techniques may exist to ameliorate the cost of calculating query execution statistics. One approach involves the random selection of rows. In other words, to calculate a statistic such as a minimum or maximum value among all values in a particular column, the database management system might make a random selection of that column's values. However, this approach may still take time proportional to the size of the entire table.

Another approach involves summarizing statistics at the partition level. Some database management systems may consist of a number of computing nodes, each of which manages a portion of the data often described as a partition. Various schemes may be employed to identify which data belongs in which partition, one example being assigning data with primary keys beginning with "A" through "M" to a first computing node and assigning data with primary keys beginning with "N" through "Z" to a second computing node. Numerous other methods might be employed to distribute data between the partitions. In addition, each partition might contain a synopsis structure summarizing optimization statistics applicable to each partition. However, the use of synopsis structure may have various associated drawbacks. First, the synopsis structures may consume a significant amount of space in the database management systems metadata catalog. The approach may force a trade-off between a larger number of partitions and a greater consumption of disk space on the one hand, and few partitions and slower statistics recalculation times on the other. A second drawback is that statistics recalculation times are proportional to the size of the data in the partition. Although this may be an improvement over proportionality to the size of the entire table, it is less ideal than a method that is roughly proportional to the size of the inserted data.

FIG. 1 depicts an embodiment of a database warehouse system 100 that optimizes a query using incrementally updated statistics. Data warehousing system 100 comprises at least one query optimizer 102 and one or more storage devices, such as the depicted storage devices 104 and 106. The query optimizer 102 relies at least in part on query optimizer statistics 108 to generate a plan of execution for a query over or otherwise implicating table 120.

Query optimizer statistics 108 may be stored in various locations, such as on the depicted storage device 104. The statistics may be accessed by query optimizer 102, which may for example comprise part of a component of a database management system In some embodiments, a data warehousing system may contain a plurality of computing nodes, each of which comprises a separate query optimizer 102 and set of query optimizer statistics 108. In other embodiments, a there may be a single repository for query optimizer statistics 108 which is accessed by one or more instances of query optimizer.

Data warehouse system 100 maintains a table comprising rows of columnar data. The data may be stored based on various segmentation techniques, such as dividing the table into blocks that each contains a subset of the rows. Table 120 depicts such an arrangement, having blocks 110 and 112 representing data stored within table 120. In some embodiments, blocks 110 and 112 may correspond directly or indirectly to the granularity or storage device 106, such that read and write operations are at least partially aligned with the storage characteristics of the device. Some embodiments may segment data in the table 120 by rows, so that each block contains a subset of the rows including all column values for each row. Other embodiments may employ a column-based storage technique, in which a given block contains multiple rows of a single column of data. This approach may be advantageous in data warehouse applications because fewer blocks need to be read from the storage device compared to row-segmented blocks.

A new set of values 118 may be added to table 120. The new set contains at least one column that corresponds to a column of table 120. In some embodiments, a block 114 containing the new set of values 118 may be stored on storage device 106. Block 114 may contain block-level information describing various statistical properties of data stored within the block, such as min/max values, information concerning the distribution of values in a column of data stored in the block, the number of distinct values in each column and so forth.

In an embodiment, min/max values for the entire table may be calculated by scanning all blocks in table 120 and the new set of values 118, and then examining associated block-level min/max values. Although the block-level min/max values may be stored in a block header, a zone map or other similar structures may be employed to eliminate the need to load each individual block header. Scans of the zone map or similar structure may be more efficient than doing a full table scan, or even a full scan of a conventional index.

In an embodiment, history information 116 may be employed to determine a region or set of blocks that are not yet reflected in the statistics. In some embodiments a block may comprise entirely new data, such as block 114, while other embodiments may attempt to utilize space in existing blocks. Numerous additional approaches are possible. In general terms, history information 116 provides information usable to determine characteristics of data loaded subsequent to the last time statistics were recalculated over the entire table. Recalculation over the entire table may involve a scan of all of the rows of the table, or equivalently all of the columns in a particular row, in order to factor the column values into the computation. In some embodiments, statistical techniques or block-level scans are applied instead of fully examining the column values in each row.

An update of the optimizer statistics may be made by utilizing history information 116 to locate blocks added following the most recent update to the query optimizer statistics. For example, FIG. 1 depicts history information 116 as referring to block 114, which contains new data, while blocks 112 and 110 of table 120 contain previously loaded data. A scan of all new blocks may be performed to calculate a min/max value for data that has been loaded since the last time statistics were recalculated using all available rows. These values may be compared to the previous min/max values for the column, and the min/max statistics may be adjusted accordingly.

History information 116 may take many forms. In some embodiments, it may be a linked list, map or other structure referring to the new data. Other embodiments might employ a query of some form, such as structured query language ("SQL"), which implicates only those blocks containing new data. In some embodiments history information 116 may be collocated with the blocks themselves or represented by various structures such as zone maps, indexes and so forth.

In an embodiment, a history of data added over time may be kept. This may comprise the information necessary to calculate incremental statistics updates, such as min/max values, histograms, number of rows inserted and so forth. The history may be recorded in various types of structures, such as tables, lists, log files and so forth. Although depicted in FIG. 1 as referring to block 114, history information 116 does not necessarily have to reference or even correspond directly to the blocks kept on a storage device, such as the depicted storage device 106. For example, in some embodiments, each entry in the history may refer to a distinct load operation, rather than the blocks in which the new data was stored.

Figure 2:
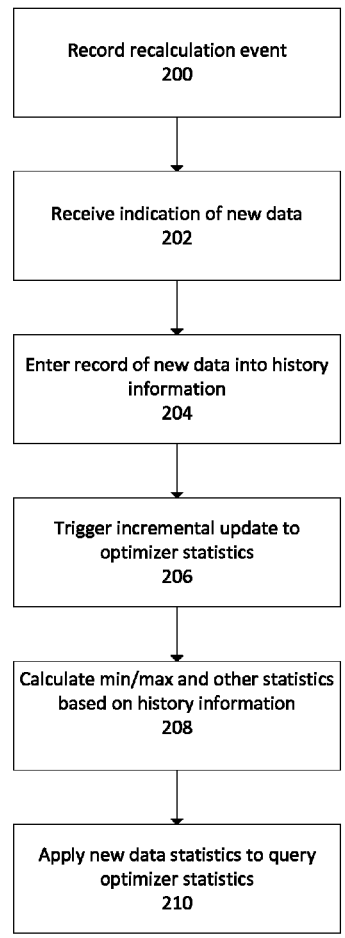
FIG. 2 is a flowchart depicting a process for recording a history of data load events and using the information to incrementally update optimizer statistics.

FIG. 2 depicts an embodiment for recording a history of data added over time, and using the recorded history to update optimizer statistics. At operation 200, query optimization statistics are recalculated in full. The event is recorded, possibly in the same structure as other history information. In an embodiment, this information is instead available through the database management system and may be retrieved from the metadata catalog. Various query optimization statistics corresponding to this event may be available through the metadata catalog or other structure or mechanism.

At operation 202, an indication of new data is received. The indication may, for example, be sent by the database management system's storage engine to a logging component. In some embodiments, the indication may comprise a link or reference to the new data or to a set of blocks containing the data. In other embodiments, the indication may comprise information describing the new data, such as min/max values for the new data, row counts for the new data and so forth.

At operation 204, information about the new data is recorded in the history. The information may comprise various aspects of the new data, such as the date and time of addition, min/max values, row counts, statistical distribution and so forth. When an incremental update to optimizer statistics is triggered at operation 206, these values may be used to calculate incrementally updated statistics. In some embodiments, the new data or blocks containing the new data may be scanned to calculate these values.

Once an incremental update has been triggered, at operation 206, the history information may be scanned to incrementally determine min/max and other query optimization statistics, as depicted by operation 208. If more than one entry has been recorded in the history information subsequent to the last recalculation, these entries may be combined and then computed and applied to the stored query optimizer statistics, as depicted by operation 210.

As a general proposition, the overall statistical properties of a large set of data are unlikely to change much by the addition of a comparatively tiny amount of new data. For example, the query optimization statistics for a data warehouse containing many years of sales data might contain certain values, such as data distribution histograms, whose true values are unlikely to change significantly upon the addition of one day's worth of sales data.

However, there are some statistical properties that are subject to potentially significant change when relatively small amounts of data are added to a table. One example is minimum and maximum values. For a given column, the minimum and maximum values are the smallest and largest values among all of the values that comprise the column. A single value, if it is small enough or large enough, may change the minimum or maximum value significantly. For some types of data, such as data that generally follows a Gaussian probability curve, the probability of a single value affecting the minimum or maximum value may be relatively small. However, for other types of data there may be a significant possibility that the minimum or maximum value could change. One example involves data and time data, which for some applications may increase monotonically. Adding data that follows this pattern is almost certain to affect the maximum value for a column, and if these changes are not reflected in the statistics, the quality of the plans generated by the query optimizer may be affected.

Various applications may favor queries favoring more recent data. For example, various reports might be generated for periods such as the past day, week or month. For such applications, the query optimizer might be impacted if the statistics do not reflect the most recent data. This may be particularly true with aspects of the query optimizer that rely on min/max data, and even more so when monotonically increasing or decreasing data is involved.

As a non-limiting example of a query that can be affected by inaccuracies in min/max data, consider a query selecting the most recent day's sales data. Queries such as these may expressly select the maximum of date values in a column as a means of selecting the most recent date, for example by specifying a filter clause that compares the maximum date in the table to today's date. If the statistics do not reflect recent additions, the query optimizer may inaccurately conclude that the query will return no rows and the quality of the generated plan could be compromised.

Database management systems may calculate min/max values on a per-block basis and associate the information with the block, for example by writing the information in a block header structure. Indexing structures, which might for example be referred to as a zone map or range-restricted scan, may be employed to determine the range of data in any particular block. The block headers and zone maps may be employed to improve table scan performance by allowing blocks that do not contain relevant information, as indicated by the block's min/max values, to be skipped.

Figure 3:
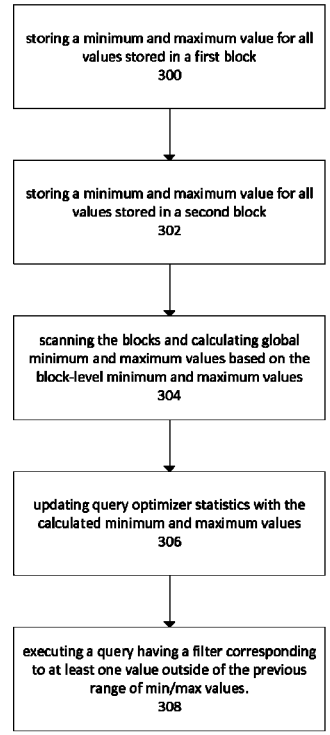
FIG. 3 is a flowchart depicting an embodiment of a process for incrementally updating optimizer statistics based on block-level minimum and maximum ("min/max") information.

FIG. 3 depicts an embodiment for incrementally updating optimizer statistics based on min/max values derived from block header information. At operations 300 and 302, minimum and maximum values for all values contained within each block are recorded. The values may be recorded with other block header information or in a separate structure or other arrangement. It may also be advantageous to store additional block-level information, such as the number of rows in the block or a histogram representative of value distributions within the block.

A min/max value for the entire table may be calculated, as depicted by operation 304, by scanning the block-level min/max information and computing a global maximum. The min/max values stored within the optimizer statistics repository may then be updated, as depicted by operation 306. In some embodiments, other statistical summaries may be generated by scanning the blocks, for example by summing the number of rows in each block to obtain a total number of rows. A count of the number of distinct values in the column might also be generated at this time.

In some embodiments, operation 304 may skip any blocks that have not been changed since the previous statistics recalculation. In other words, an embodiment might scan only those blocks affected by data load events since the last full recalculation. The min/max values calculated in the scan may then be combined with the currently stored optimizer statistics, which may then be updated with the new value, as depicted by operation 306.

Operation 308 depicts a query executed after the update to the min/max values stored in the optimizer statistics. As depicted, the query specifies a filter condition that implicates a minimum or maximum value outside of the range of the min/max values previously stored in the optimizer statistics. Because the optimizer statistics have been appropriately updated, the query optimizer will perform optimization on the query using accurate min/max values, which may affect the quality of the generated plan.

The number of distinct values in a column may also be useful to the query optimizer. For example, the query optimizer might use the number of distinct values in a column as an estimate of a query's selectivity, which is an indicator of the number of rows the query is likely to return. Selectivity estimates may be used to determine optimization strategies for the query.

Although the number of distinct values is unlikely to change when a small amount of data is added to a much larger dataset, data warehouse applications may occasionally merge a dataset that is roughly equivalent in size to the data already loaded, or at least where the smaller of the two is nevertheless of a significant size. In such cases it would be advantageous to calculate query statistics using a technique that is roughly proportional to the size of the new data, rather than that of the existing data for which statistics have already been computed.

One possible approach involves using a current number of repetitions per value as a forecast of the expected distribution of the new data. The estimated number of distinct values may be increased consistent with the expected distribution and the number of rows in the new data. This technique may be applied to both the number of distinct rows containing a particular value and to the overall number of distinct rows in the column.

In the case of primary key columns or columns that are constrained to be unique, the number of rows being added is accurate and can be added directly to the distinct value count. A similar technique may be applied to columns that are foreign keys. Because a foreign key column may refer to a primary key in the parent table, the number of unique primary key values added to the parent table can be accurately counted. This count can then be used to estimate the number of unique values in the foreign key column, for example by assuming an even distribution in the foreign key column of all of the unique values in the parent table. In another embodiment, the distribution may be weighted in favor of new primary key values in the parent table.

Figure 4:
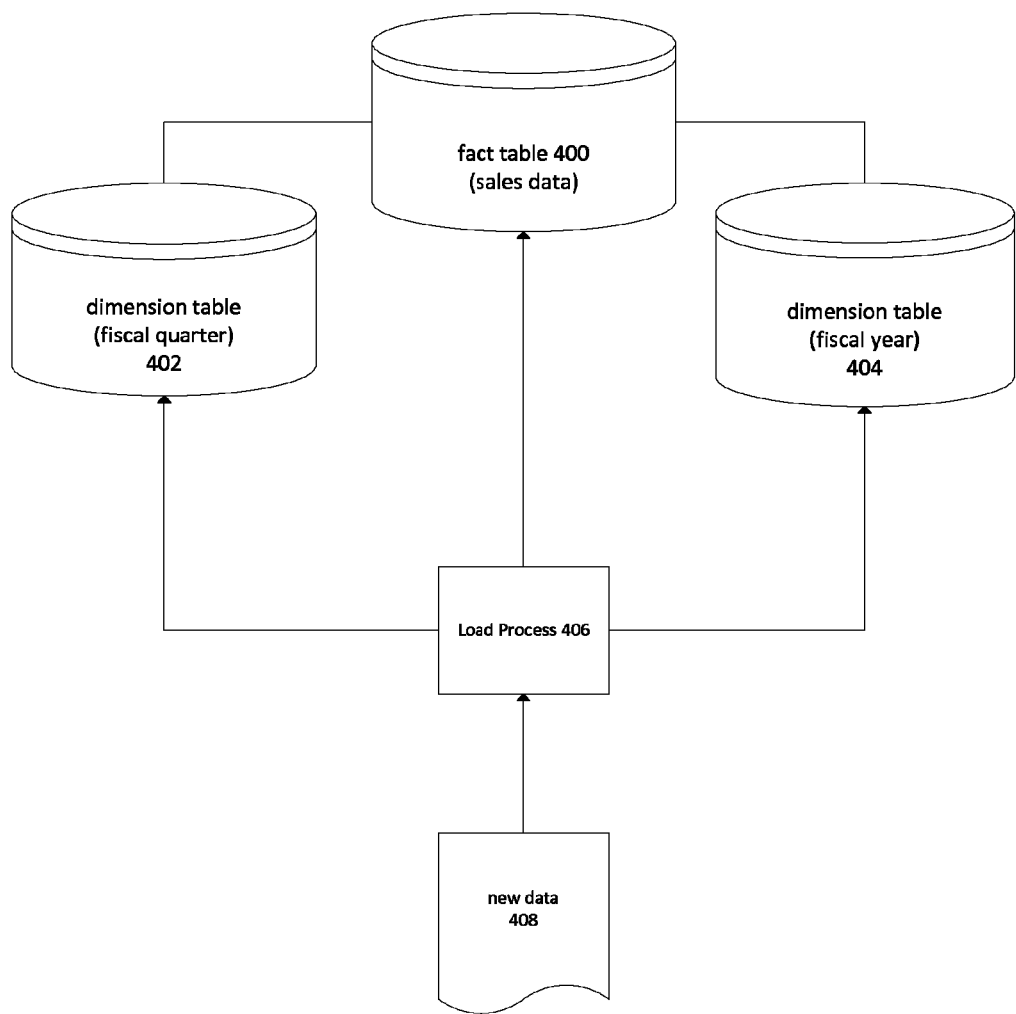
FIG. 4 is a diagram depicting a data loading process for a data warehouse comprising a central fact table and associated dimension tables.

FIG. 4 depicts an embodiment of a data warehouse employing a star schema arrangement in which a central fact table 400 is depicted as containing sales data with foreign keys referring to dimension tables 402 and 404. Dimension table 402 refers to the fiscal quarter dimension and has a primary key indicative of a fiscal quarter, such as "Q1." Similarly, dimension table 404 refers to the fiscal year and has a primary key value indicative of a year, such as "2013." Each of these dimensions contains a predictably small set of potential values.

Load process 406 may be employed to orchestrate the loading of new data. In some embodiments, this operation may be associated with a database command, utility application, command-line interface and so forth, which might be used to load new data. In some embodiments, load process 406 may be provided with information helpful in characterizing the new data, such as an expected distribution of values.

Load process may be configured to process new data 408 and load it into the data warehouse, which in the depicted example comprises fact table 400 and the two dimension tables 402 and 404. The new data may result in new rows being inserted, not only into fact table 400 but also into dimension tables 402 and 404.

The number of unique year and quarter values added to dimension tables 402 and 404 may be determined based on a one-to-one correspondence with the number of rows added. The number of unique foreign key references in the fact table may be estimated based on an expected distribution. The expected distribution may be supplied to load process 406, and might, for example, indicate that the new data pertains exclusively to the current quarter of the current year.

It may be advantageous to employ history information or summary statistics concerning the new data to improve the results. For example, the history information might include the number of unique values in the new data, as well as the number of rows, which may be used to produce an improved indication of how many unique values are present after the new data has been combined.

Histograms of various forms may also be employed to represent the distribution of values within a column and may be of value to the query optimizer. In particular, histograms may be useful in representing non-uniform data distributions. One type of histogram that may be employed is a height-balanced histogram, in which each bucket or band is assigned an equal number of rows, and in which the range of values within each bucket is indicative of the distribution of data in the column. A height-balanced histogram may be useful when the column contains a large number of distinct values. When there are fewer distinct values, a frequency histogram may be preferred. In one embodiment of a frequency histogram, each distinct value is assigned to a separate bucket, so that for each bucket the height of the histogram indicates the number of occurrences of the corresponding value. Other embodiments of frequency histograms might group ranges of values together in a single bucket and use the height of the bucket to indicate the total number of all values falling within the range of the bucket.

Figure 5:
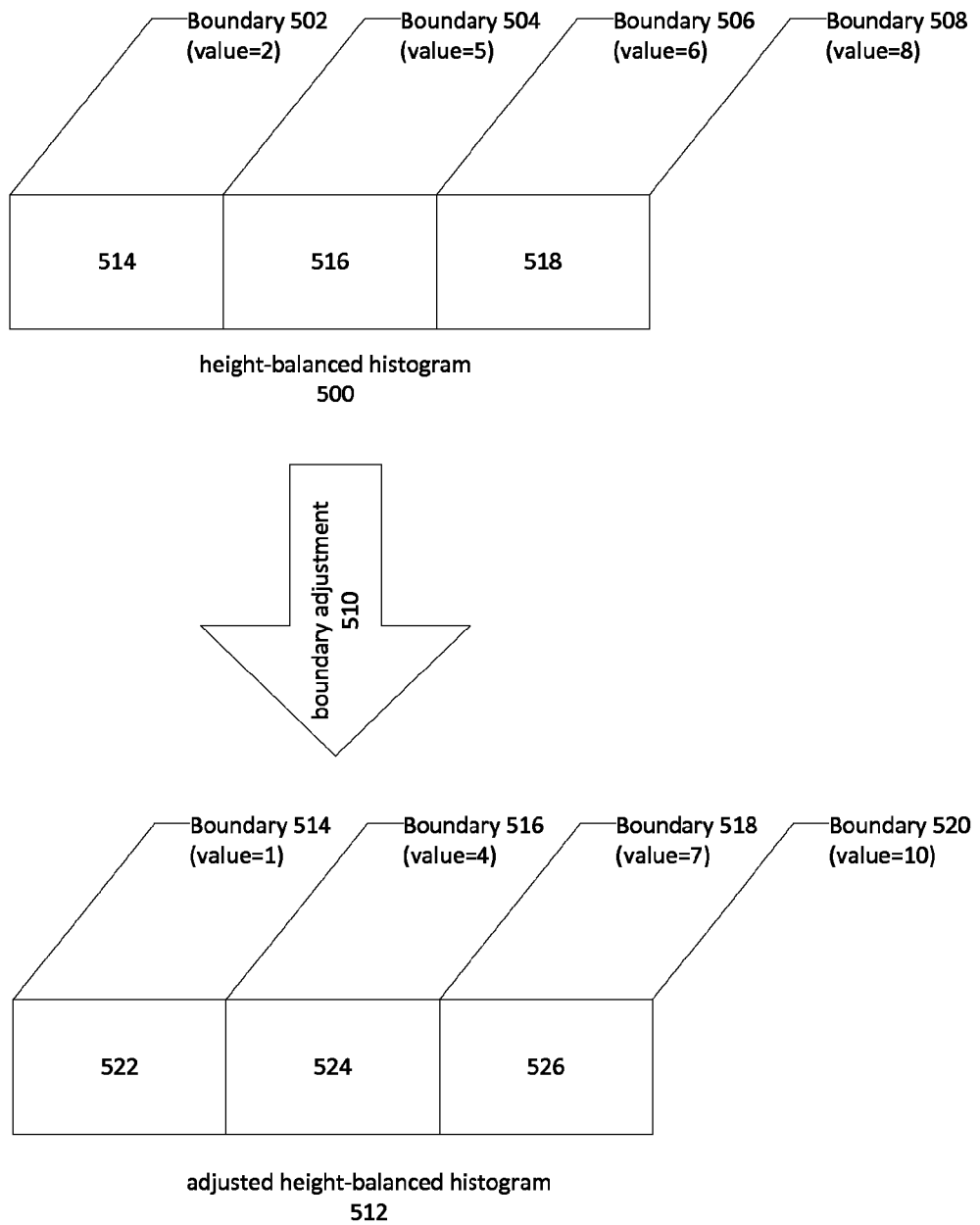
FIG. 5 is a diagram depicting adjustment of a height-balanced histogram based on the minimum and maximum values and the number of new rows in new data.

A height-balanced histogram for a current set of values may be adjusted to reflect new data based on new min/max values and the number of added rows, each of which may be calculated using techniques consistent with the present disclosure. FIG. 5 depicts an embodiment of adjusting a height-balanced histogram based on min/max values and the number of added rows. Height-balanced histogram 500 represents the current distribution of data within a column and is employed by the query optimizer to produce improved query plans. Boundaries 502, 504, 506 and 508 represent the range of data contained within each bucket of the histogram. For example, bucket 514 contains data between the values 2 and 5, as indicated by boundaries 502 and 504. Buckets 514, 516 and 518 each represent approximately the same number of column values.

After the addition of the new data, the outer boundaries of height-balanced histogram 500 may be adjusted, depicted in FIG. 5 as arrow 510. For example, if the minimum value in the new data was 1, boundary 502 in the original height-balanced histogram 500 may be adjusted to the value 1 in adjusted height-balanced histogram 512, as seen at boundary 514. The maximum value may be adjusted similarly, so that boundary 508 is adjusted from a value of 8 to a value of 10, as seen in FIG. 5 at boundary 520. The interior boundaries of the histogram, such as the depicted boundaries 516 and 518, may be adjusted based on the new min/max values as well as the number of added rows. For example, in adjusted height-balanced histogram 512, the interior bucket 522 now represents at least one additional value, the new minimum value of 1 indicated by boundary 514. Because buckets 524 and 526 must each contain approximately the same number of rows, boundaries 516 and 518 must be adjusted accordingly. Knowing the distribution of values within the new rows may aid the accuracy of the adjustment.

Frequency histograms may also be incrementally updated. When new data is being merged into an existing table, a frequency histogram can be calculated for the new data. The existing histogram may then be updated by combining corresponding buckets and adding new buckets. If both the existing histogram and the histogram for the new data use a unique bucket to represent each distinct value, the combination of the two will be accurate. However, adjusting the existing histogram may also be advantageous when each bucket is associated with a number of distinct values. However, as new data is added to the existing table, a particular distinct value may begin to appear often enough to warrant assignment to a separate bucket or to otherwise adjust the association of values to buckets. In such cases, it may be advantageous to recalculate statistics over the entire table.

In addition to the scenario just described, other situations may also warrant recalculating statistics over the entire table. However, determining when it is advisable to recompute statistics is not a trivial task, and there is little value in recalculating statistics if the updated statistics are not likely to influence query optimizer behavior in a significant way. Furthermore, recalculating statistics over an entire table carries with it a number of associated risks. First, it is resource intensive and may in some circumstances jeopardize the performance or stability of the system. In addition, recalculating statistics for the entire table may be more likely to cause significant changes to the behavior of the query optimizer than incremental updates. This in turn may result in altered query plans, which in some cases may have unexpected detrimental effects.

Statistics that are out-of-date such to the extent that they no longer accurately reflect the underlying data may be referred to as stale. Various approaches may be utilized to determine whether or not statistics for a given table or column are stale. One approach utilizes a percentage or ratio based on the number of modified or inserted rows compared to the total number of rows in the applicable table.

Figure 6:
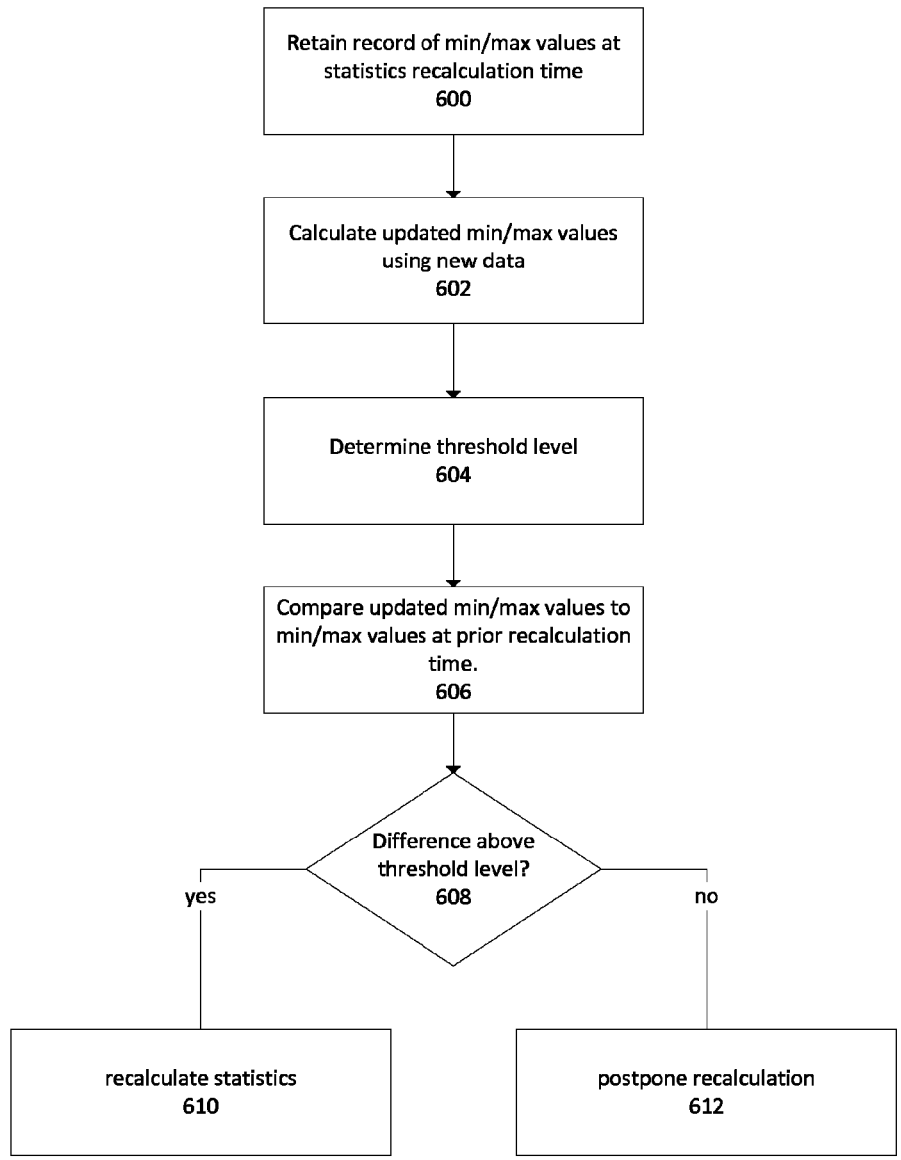
FIG. 6 is a flow chart depicting an embodiment for comparing historical and current minimum and maximum values against a threshold to determine if a statistics recalculation for the entire table is warranted.

However, an alternative and potentially more accurate measure of staleness may involve utilizing min/max figures. FIG. 6 depicts an embodiment consistent with this approach. At operation 600, a record is retained of the current min/max statistics resulting from a recalculation. The record may be the min/max values as stored in the optimizer statistics, or it may be stored separately. The latter approach may be advantageous if the optimizer statistics are being updated using techniques consistent with aspects of the present invention, such as those depicted in FIG. 1. Increasing differences in the min/max values may be indicative of inaccuracies in other statistics besides the min/max values. It may therefore be desirable to use the min/max values known at the time those values were recalculated, rather than min/max values that have been subsequently updated.

At operation 602, an updated set of min/max values is calculated. This may be done using techniques consistent with aspects of the present disclosure, for example as depicted in FIG. 1. These values may be compared to the retained min/max values of operation 600. If the differences between the new and retained values are above a threshold level, a full recalculation of values is warranted.

Operation 604 involves determining a threshold level to use in the comparison. This may be done in a variety of ways. It may be set by an operator or user of the database management system, in which case the evaluator receives an indication of an appropriate threshold level. An appropriate threshold level may also be calculated via some algorithm or heuristic. In some cases, an appropriate threshold level may depend upon the type of data involved. For example, monotonically decreasing or increasing data may lead to deviations in the min/max values that are not necessarily indicative of a need to recalculate query optimizer statistics. On the other hand, for data that generally follows a Gaussian distribution, smaller deviations in the min/max values may indicate a need to recalculate. Accordingly, it may be advantageous to receive or calculate threshold values on a column-by-column basis. The threshold values may be stored, for example, in metadata associated with each column.

At operations 606 and 608, the differences between the retained and calculated min/max values may be evaluated with respect to an appropriate threshold value. If the difference is above the threshold, statistics may be recalculated at operation 610. If the difference is below the threshold, recalculation may be postponed to a later time, as depicted by operation 612.

In an embodiment, operations 610 and 612 may be replaced by operations that send an indication to an operator, database user or other entity including automated systems to indicate that query optimization statistics have become stale. This may be advantageous because of the workload demands involved in the recalculation process, and the risk that the recalculated statistics could result in query plans that are problematic in some way. Although updated statistics normally improve, rather than degrade, query performance, there is still a risk that a change in execution plans will have some unintended negative effect. Accordingly, it may be advantageous to allow an operator to control when statistics are recalculated.

Figure 7:
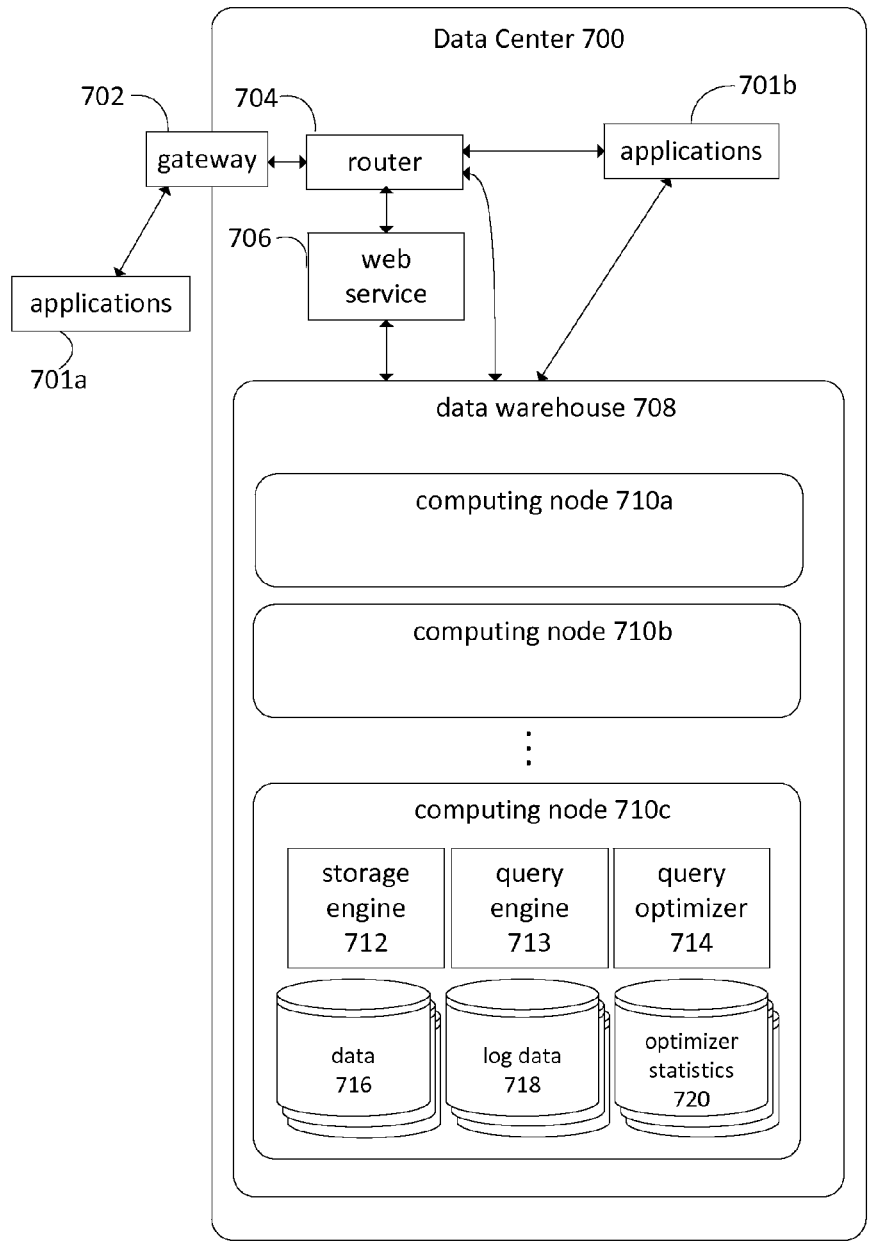
FIG. 7 is a diagram depicting a computing environment in which aspects of the present disclosure may be practiced.

FIG. 7 is a diagram depicting a computing environment in which aspects of the present disclosure may be practiced. Data center 700 may be accessed by various client applications. Client applications 701*a* may access data center 700 through various networks, such as the Internet or an Intranet, connected to gateway 702. Router 704 may route network traffic from gateway 702 to elements of data warehouse 700, such as web service 706.

Web service 706 may access data warehouse 708. In various embodiments, web services, application programs, business objects and so forth may access or provide access to data warehouse 708. Client applications 701*b* may, for example, access data warehouse 708 through web service 706 or through router 704. In some embodiments, application 701*b* may access data warehouse 708 directly.

Web service 706 may be configured to provide some combination of data access, analysis, configuration management, administration and other features relating to data warehouse 708. In an embodiment, recalculation of optimizer statistics 720 may be initiated through web service 706 or through client applications 701*a* or 701*b*.

Data warehouse 708 may comprise, for example, computing nodes 710*a*, 710*b* and 710*c*. Database management systems may be configured to operate on computing nodes 710*a*, 710*b* and 710*c*. Computing node 710*c* is depicted in FIG. 8 as configured to operate a database management system comprising storage engine 712, query engine 713, query optimizer 714, data 716, log data 718, and optimizer statistics 720. Computing nodes 710*a* and 710*b* may be configured similarly. Those of ordinary skill in the art will recognize that the database management system components depicted are illustrative of database management system concepts generally, and may be combined or reconfigured in various embodiments.

Storage engine 712 may be configured to process requests to store data, and query engine 713 may be configured to perform execution plans formulated by query optimizer 714. Query optimizer 714 may attempt to optimize storage and retrieval by formulating execution plans based at least in part on optimizer statistics 720, which may be stored on one or more storage devices accessible to query optimizer 714. Data 716 and log data 718 may be maintained on various storage devices and may be accessed for data storage, data retrieval and generating optimizer statistics 720. Data 716 comprises portions of the data under management, such s tables, rows, key-value pairs and so forth. Log data 718 comprises a record of operations performed on the database.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

A computing node may refer to various types of computing resources, such as personal computers, servers, clustered computing devices and so forth. When implemented in hardware, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A data warehousing system comprising:
   one or more storage devices configured to store statistics based upon data stored in a data warehouse, the statistics comprising a first statistical value based on a first scan of a column of a table comprising rows;

a query optimizer configured to communicate with the one or more storage devices to read the statistics in order to formulate, based at least in part on the statistics, a plan of execution for a query corresponding to the table; and one or more memories containing computer-readable instructions that, upon execution, cause the system at least to:

add received values to one or more rows of the table, the one or more rows added to one or more blocks;

determine a second statistical value for the column, the second statistical value corresponding to the added one or more rows and calculated based on locating, on the one or more storage devices, the one or more blocks containing the added one or more rows;

store an updated first statistical value by replacing the first statistical value with the second statistical value upon determining that the second statistical value is preferred to the first statistical value; and formulate the plan of execution for the query corresponding to the table, the plan of execution involving a second scan of at least one block in addition to the one or more blocks containing the added one or more rows, the formulating based at least in part on the updated first statistical value.

2. The system of claim 1, wherein the first statistical value is a maximum value and the second statistical value is preferred to the first statistical value when the second statistical value is greater that the first statistical value.

3. The system of claim 1, wherein the statistics comprise a count of distinct values in the column, and wherein the one or more memories further having stored thereon computer-readable instructions that, upon execution, cause the system at least to:

update the count of distinct values using an estimate of distinct values in the one or more rows added to the one or more blocks, the estimate based at least in part on a frequency of value repetition in the column and a count of the one or more rows added to the one or more blocks.

4. The system of claim 1, wherein the statistics comprise a histogram indicative of distribution of values within a column, and wherein the one or more memories further having stored thereon computer-readable instructions that, upon execution, cause the system at least to:

adjust parameters of a histogram based at least in part on the second maximum value.

5. A computer-implemented method for optimizing a query of a database using query optimizer statistics, wherein the query optimizer statistics comprise at least a first statistical value corresponding to blocks of rows previously stored in the database, the method comprising:

adding, to a storage device having stored thereon the blocks of rows previously stored in the database, one or more additional blocks of rows;

determining a second statistical value corresponding to the one or more additional blocks of rows added to the storage device of the database, the determining based at least in part on information indicative of a history of data load events;

storing an updated first statistical value by replacing the first statistical value with the second statistical value upon determining that the second statistical value is preferred to the first statistical value; and optimizing the query based at least in part on the updated first statistical value, wherein the optimized query comprises a scan of at least one of the blocks of rows previously stored in the database.

6. The method of claim 5, further comprising:

recalculating the query optimizer statistics by at least performing a scan corresponding to substantially all rows stored in the database when the first statistical value differs from a second statistical value by a threshold amount.

7. The method of claim 6, wherein substantially all rows comprises a statistically significant portion of all rows stored in the database.

8. The method of claim 5, wherein the first statistical value is a first count of distinct values in at least one column of the one or more blocks of rows added to the database, the method further comprising:

storing an updated first statistical value based at least in part on a frequency of value repetition in the at least one column and a count of the rows in the one or more blocks of rows added to the database.

9. The method of claim 8, further comprising determining that a count of unique values in the at least one column is equivalent to a count of values in the at least one column, based at least in part upon a determination that the at least one column corresponds to at least one of a primary key or unique constraint.

10. The method of claim 5, further comprising updating one or more parameters of a histogram corresponding to a table, the updating based at least in part on the one or more blocks of rows added to the database.

11. The method of claim 10, wherein the histogram is a height-balanced histogram and the updating is based at least in part on the second statistical value.

12. The method of claim 10, wherein the histogram is a first frequency histogram and the updating is based at least in part on a second frequency histogram corresponding to the one or more blocks of rows added to the database.

13. The method of claim 5, wherein the first statistical value is a maximum value, and wherein determining the second statistical value comprises scanning block-level maximum value records.

14. The method of claim 5, further comprising receiving an indication of an expected distribution of the one or more blocks of rows added to the database.

15. A data warehousing system comprising:

one or more storage devices configured to store a first column of data comprising a first plurality of rows;

one or more storage devices configured to store a first statistic based at least in part upon the first plurality of rows;

one or more storage devices configured to store one or more records indicative of new data corresponding to the first column of data; and one or more memories containing computer-readable instructions that, upon execution, cause the system at least to:

compute a second statistic corresponding to the new data in the first column of data by locating the one or more records using information indicative of a history of data load events; and optimize a query corresponding to the first column of data based at least in part on the second statistic, wherein the optimized query comprises access to the first plurality of rows in addition to the new data.

16. The system of claim 15, wherein the one or more records are storage blocks comprising block-level statistical summary information.

17. The system of claim 15, wherein the one or more records comprise a minimum and maximum value.

18. The system of claim 15, further comprising one or more memories containing computer-readable instructions that, upon execution, cause the system at least to calculate a ratio of distinct values to a count of total values in the first column of data.

19. A non-transitory computer-readable storage medium having stored thereon instructions that, upon execution by a computing device, cause the device to at least:
- maintain a first column of data on one or more storage devices;
- maintain a first statistic pertaining to the first column of data on the one or more storage devices;
- maintain one or more records corresponding to data added to the first column of data subsequent to a time that the first statistic was calculated;
- compute a second statistic corresponding to the data added to the first column of data by locating the one or more records based at least in part on information indicative of a history of data load events;
- replace the first statistic with the second statistic; and
- perform a scan of the first column of data based at least in part on the second statistic, the scan comprising data of the first column of data not used to calculate the second statistic.

20. The computer-readable medium of claim 19, wherein the one or more records comprise minimum and maximum values for a subset of the first column of data.

21. The computer-readable medium of claim 19, wherein the one or more records comprise one or more of a count of distinct values for a subset of the first column of data and a histogram indicative of a distribution of data in the subset of the first column.

22. The computer-readable storage medium of claim 19, wherein the second statistic is computed based at least in part on a count of distinct values.

23. The computer-readable storage medium of claim 19, wherein the second statistic is computed based at least in part on an expected distribution of values in a subset of the first column.

24. The computer-readable storage medium of claim 19, wherein the one or more records correspond to blocks of data stored on the one or more storage devices.

* * * * *